April 9, 1963  R. KREMP ET AL  3,084,605
DIAPHRAGM ASSEMBLY FOR PHOTOGRAPHIC CAMERAS
Filed Dec. 13, 1961  3 Sheets-Sheet 1

INVENTORS
RUDOLF KREMP
PAUL FROST
FRIDOLIN HENNIG
BY
Michael S. Striker
Attorney April 9, 1963  R. KREMP ET AL  3,084,605
DIAPHRAGM ASSEMBLY FOR PHOTOGRAPHIC CAMERAS
Filed Dec. 13, 1961  3 Sheets-Sheet 2

INVENTORS
RUDOLF KREMP
PAUL FROST
FRIDOLIN HENNIG
BY
Michael S. Striker
Attorney April 9, 1963 R. KREMP ET AL 3,084,605
DIAPHRAGM ASSEMBLY FOR PHOTOGRAPHIC CAMERAS
Filed Dec. 13, 1961 3 Sheets-Sheet 3

INVENTORS
RUDOLF KREMP
PAUL FROST
BY FRIDOLIN HENNIG

Michael S. Striker
Attorney

United States Patent Office 3,084,605
Patented Apr. 9, 1963

3,084,605
DIAPHRAGM ASSEMBLY FOR PHOTOGRAPHIC
CAMERAS
Rudolf Kremp, Paul Frost, and Fridolin Hennig, all of Munich, Germany, assignors to Agfa Aktiengesellschaft, Leverkusen-Bayerwerk, Germany
Filed Dec. 13, 1961, Ser. No. 159,827
Claims priority, application Germany Dec. 15, 1960
11 Claims. (Cl. 95—10)

The present invention relates to cameras.

More particularly, the present invention relates to cameras which are capable of being operated either automatically or manually or with flash illumination.

Cameras of this type providing these various possibilities of operation are extremely complex and expensive.

It is a primary object of the present invention to provide a camera which while giving these various possibilities of different types of operation is at the same time extremely simple and far less expensive than conventional cameras which will also produce similar results.

Another object of the present invention is to provide a camera of this type with a diaphragm which requires nothing in addition to the diaphragm rings themselves for setting the diaphragm in its various positions for producing the above different types of operation and for manually setting the diaphragm at a selected aperture.

It is furthermore an object of the present invention to provide a camera of this type with a focusing ring which can have the scale of distances thereon distributed over a relatively large angle to provide a relatively large range of turning of this focusing ring even though the camera can produce the above-mentioned different types of operations, and this again is in sharp contrast with the known constructions where a camera which can provide different types of operation will have exceedingly small range of turning of the focusing ring.

Still another object of the present invention is to provide a camera of this type which does not require any complex mechanisms to render certain units inoperative during a selected type of camera operation.

The objects of the present invention also include the provision of a camera capable of accomplishing the above objects and at the same time composed of rugged elements which can be quickly assembled and which are very reliable in operation.

With these objects in view the invention includes, in camera which is adapted to provide automatic, manual or flash operation, a pair of rotary diaphragm rings and a plurality of diaphragm blades located between and operatively connected to said rings to be controlled thereby. A yieldable means cooperates with the rings to hold them in a predetermined angular position with respect to each other, and the rings are turnable together in this angular position with respect to each other, without any relative angular turning therebetween, to the several positions which provide the different types of operation. In these several positions there are means which will cooperate with one or the other of the rings to maintain it stationary while the remaining ring is turned so as to set the diaphragm. One of the diaphragm rings is accessible to the operator so that this one ring also serves as the manually operable diaphragm setting means.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figure 1:
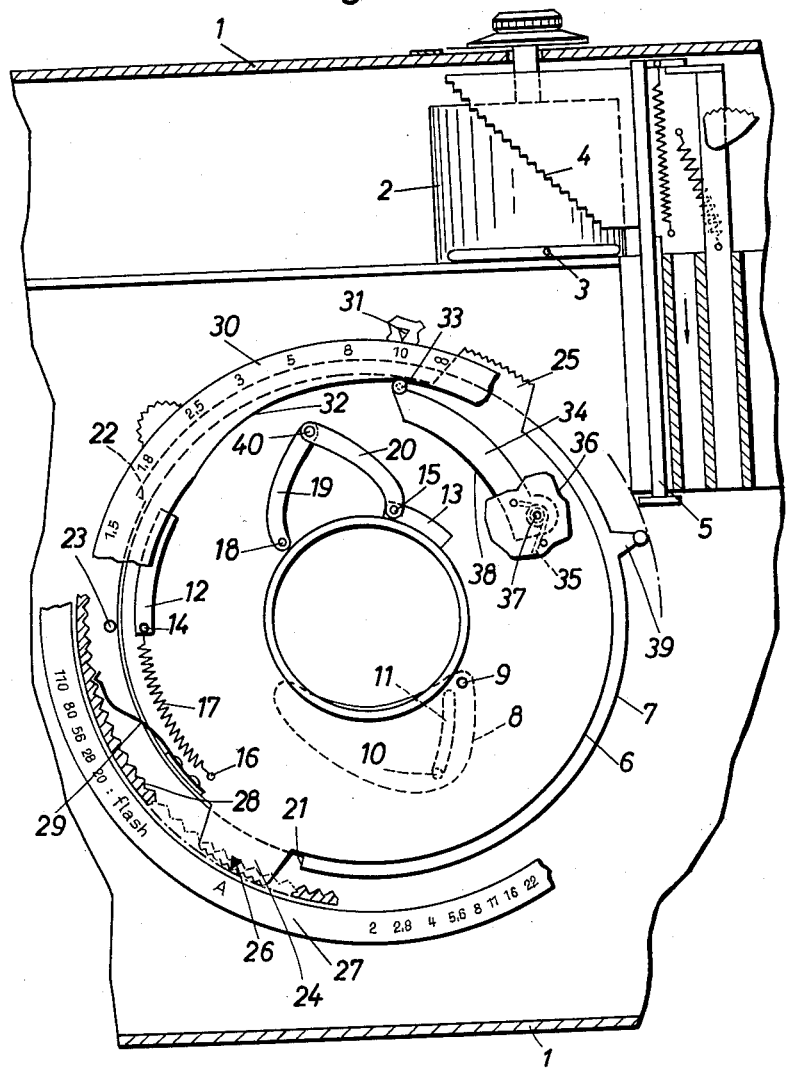
FIG. 1 is a fragmentary, partly sectional, elevational view of a camera showing the structure of the invention, and part of the structure which cooperates with the structure of the invention is shown diagrammatically.

Referring to FIG. 1, there is fragmentarily illustrated therein a camera housing 1 which carries in a conventional manner in an upper part of the housing a light meter 2 in the form of a galvanometer or the like adapted to be actuated from a photocell, photosensitive resistor, or the like, and this meter 2 is capable of being turned manually about its axis for setting the factor of the speed of the film into the camera in a well known manner. The meter 2 includes a turnable pointer 3 whose angular position of course is determined by the lighting conditions, and the elements 2 and 3 form part of a light-responsive means which includes in addition a scanning plate 4 which, when the light-responsive means is released for operation, will in a well known manner move downwardly until it engages the pointer 3 so that in this way the extent of downward movement of the scanning plate 4 will be determined by the lighting conditions, and this plate 4 is fixed to an elongated rod 5 which also moves downwardly through a distance determined by the lighting conditions. This light-responsive structure is well known. The lower end of the rod 5 cooperates with the diaphragm structure of the invention for automatically determining the size of the exposure aperture when the diaphragm is set for automatic operation, as described below.

The diaphragm of the invention includes a pair of rotary diaphragm rings 6 and 7 which are supported for rotary movement about the optical axis, for example on the tube of the objective which carries the lenses thereof. A plurality of diaphragm blades 8 are located between and are operatively connected to the rotary diaphragm rings 6 and 7 to be controlled thereby, and only one blade 8 is shown in the drawings for the sake of clarity. It will be noted that the diaphragm blade 8 is pivotally connected to the rotary diaphragm ring 6 by way of a pin 9, and the rotary diaphragm ring 7 is formed with a plurality of slots 11 corresponding in number to and respectively cooperating with the several blades 8, only one slot 11 being shown in the drawing. The blade 8 fixedly carries a pin 10 which extends into the slot 11, so that in this way when one of the rings 6 and 7 turns with respect to the other the several blades 8 will turn in order to change the size of the exposure aperture.

The rotary diaphragm ring 6 is formed with a pair of arcuate slots 12 and 13, and a pair of pins 14 and 15 are fixed to the rotary diaphragm ring 7 and extend from the latter respectively through the slots 12 and 13, as is evident from FIG. 1. An elongated spring 17 is fixed at one end to the pin 14 and at its opposite end to a pin 16 which is carried by the rotary diaphragm ring 6, so that this spring 17 forms a yieldable resilient means for holding the rings 6 and 7 in the illustrated angular position with respect to each other, the spring urging the pin 14 against the lower end of the slot 12, as viewed in FIG. 1, and the rings 6 and 7 will turn together while remaining in the angular position where the pin 14 engages this end of the slot 12, until some other influences act on these rings as described below.

Thus, the rings 6 and 7 are pulled together in a yieldable resilient manner by way of a spring 17. These rings 6 and 7 are also coupled together by a toggle linkage 19, 20 in the form of a pair of identical curved links pivotally connected to each other as indicated at 40, with the link 20 pivotally connected to the pin 15 and the link 19 pivotally connected to a pin 18 which is fixedly carried by the diaphragm ring 6. The purpose of the toggle linkage 19, 20 is described below. Thus, these rings are coupled to each other not only by the spring means 17 but also by the toggle linkage 19, 20. It will be noted that the elements of the toggle linkage 19, 20 are symmetrically arranged with respect to each other.

The rotary diaphragm ring 7 is provided along its outer periphery with a pair of stop shoulders 21 and 22 between which a stationary stop pin 23 is located, this pin 23 being carried by any stationary part of the camera, so that the diaphragm ring 7 is limited to turning movement between the position where the stop 21 engages the pin 23 and the position where the stop 22 engages the pin 23.

In accordance with the present invention a portion of the diaphragm ring 6 is accessible to the operator so that this diaphragm ring 6 can be directly turned by the operator for the purpose of manually setting the diaphragm, and for this purpose the diaphragm ring 6 has a pair of peripheral substantially radial projections 24 and 25 which extend to the exterior of the objective assembly of the camera and which are available to the operator so that by engaging these projections 24 or 25 the operator may turn the rotary diaphragm ring 6. The projection 24 carries an index 26 which is adapted to cooperate with a scale arrangement located at the exterior of the camera. This scale arrangement is indicated at 27 and includes at the lower part of the scale 27, as viewed in FIG. 1, a scale of diaphragm settings used during manual setting of the diaphragm, at the upper left part of the scale 27, as viewed in the drawing, a scale of flash guide numbers, and between these two scales the symbol A indicating the position to which the ring 6 is manually turned for the purpose of providing automatic operation, and it will be noted that the ring 6 is illustrated in this latter position in FIG. 1. A releasable detent means is provided for yieldably holding the ring 6 in a selected one of a plurality of positions, and this detent means includes the elongated leaf spring 29 which is fixedly carried by the ring 6 and which has a free end adapted to be selectively engaged in one of a row of notches 28, as indicated in FIG. 1.

A rotary focusing ring 30 is supported for rotary movement about the optical axis, concentrically with the rings 6 and 7 and serves in a well known way to adjust the objective so that the camera will be properly focused on a selected subject, and the ring 30 carries a scale of distances which cooperates with a stationary index 31, and the ring 30 is shown in FIG. 1 in the position it takes when set for a distance of 10 meters between the subject and the camera. In accordance with the present invention the focusing ring 30 has an elongated camming portion 32 which forms part of a motion transmitting means for transmitting rotary movement of the ring 30 to the rotary diaphragm ring 7, and this motion transmitting means includes in addition to the camming portion 32 of the focusing ring 30 a lever 34 which carries a pin 33 which engages the camming portion 32 so that the angular position of the lever 34 of the motion transmitting means will be determined by the angular position of the focusing ring 30. This lever 34 of course may simply have an end thereof engaging the camming portion 32 instead of being provided with a special pin 33 for this purpose. The lever 34 is supported for rotary movement about a stationary pivot 37 carried by a wall portion 36 of the camera, and a spring 35 is coiled about the pivot 37, has one end engaging a pin of the lever 34 and has its opposite end engaging a stationary pin carried by the wall 36, so that this spring 35 serves to urge the lever 34 in a clockwise direction, as viewed in FIG. 1, so as to maintain the pin 33 in engagement with the camming portion 32. The lever 34 itself has a camming edge 38 which forms part of the motion transmitting means, and the remainder of this motion transmitting means is formed by the toggle linkage 19, 20 so that when this edge 38 acts on the pin 40 the rotary movement of the ring 30 will be transmitted to the ring 7 for turning the latter in a manner described below.

As is indicated in FIG. 1, when the index 26 of the ring 6 is in alignment with the symbol of the scale 27 which indicates automatic operation, the leaf spring 29 has its free end located in a corresponding notch 28 so that the rotary diaphragm ring 6 will be releasably maintained with the detent means in this way against rotary movement. Thus, it will be noted that the rings 6 and 7 will turn as a unit to the position for automatic operation and in this position a structure is provided to maintain the ring 6 stationary. During automatic operation the light-responsive means 2—5 is released for operation in a well known manner so that the rod 5 will move downwardly, and when the parts are set for automatic operation a projection 39 of the rotary diaphragm ring 7 is located in the path of downward movement of the bottom end of the rod 5, so that as this rod 5 moves downwardly it engages the projection 39 and turns the ring 7 with respect to the ring 6, in opposition to the spring 17, in a clockwise direction, as viewed in FIG. 1, and of course the extent of turning of the ring 7 will be determined by the lighting conditions. The turning of the ring 7 of course results in turning of the slots 11 with respect to the blades 8 so that these blades by cooperation of the edges of the slots 11 with the pins 10 are turned about the pins 9 to reduce the size of the exposure aperture, and the automatic structure operates to provide automatically an exposure aperture which is in accordance with the particular lighting conditions. After an exposure is made the light-responsive means will return to its rest position shown in FIG. 1, and the spring 17 will return the ring 7 to the position thereof indicated in FIG. 1.

If it is assumed that the diaphragm is to be set manually, either with one of a plurality of instantaneous selected exposure times or with ball operation according to which the shutter will be manually maintained open for as long as the operator desires, then the rings 6 and 7 are turned as a unit, by manual turning of the ring 6, until the index 26 reaches the scale of diaphragm settings located at the bottom part of the scale arrangement 27, as viewed in FIG. 1. The construction is such that when the index 26 reaches the first graduation of the scale of diaphragm openings, this graduation in the particular example being that which represented the size of the largest diaphragm opening, the stop shoulder 22 of the ring 7 will simultaneously reach and engage the stop pin 23. Thus, when the index 26 has been placed on the graduation indicating the largest diaphragm aperture the ring 7 will have reached one end of its possible range of turning, and upon further turning of the ring 6 to place the index 27 in alignment with a selected aperture smaller than the largest aperture the ring 7 will no longer turn with the ring 6 so that at this time the ring 6 turns in a counterclocwise direction, as viewed in FIG. 1, with respect to the ring 7 so as to move the pins 9 around the optical axis with the result that the pins 10 will respectively move along the slots 11 to turn the blades 8 around the pins 9 toward the optical axis to provide a smaller exposure aperture according to the selected angular position of the index 26. While the ring 7 is maintained stationary at this time by engagement of its shoulder 22 with the pin 23, the spring 29 moves along from one notch 28 to the next notch 28 until the index 26 is placed in alignment with the selected aperture graduation, and the spring 17 is of course being tensioned to an increasing degree at this time. However, the resistance to return movement of the ring 6 by the spring 17, provided by cooperation of the spring 29 with the notches 28, is great enough to yieldably maintain the ring 6 in opposition to the spring 17 in the angular position selected by the operator to provide in a manual way the selected aperture. The exposure time may be determined by any conventional exposure time setting structure or a Ball exposure may be provided when the exposure is made.

It will be noted that when the rings 6 and 7 are in the automatic position indicated in FIG. 1, the toggle linkage means 19, 20 is beyond the range of the lever 34 so that motion transmitting means is in this way rendered inoperative and turning of the focusing ring 30 at this time will have no influence on the ring 7. On the other hand, when the ring is set for automatic operation as indicated in FIG. 1 the projection 39 is located in the path of movement of the light-responsive means so as to be capable of being engaged thereby for turning the ring 7 in the manner described above when the camera is set for automatic operation. Turning of the rings 6 and 7 to the position providing manual setting of the diaphragm, with the shoulder 22 of the ring 7 engaging the pin 23, of course locates the toggle linage means 19, 20 even further from the lever 34 than illustrated in FIG. 1, so that here again the motion transmitting means is inoperative and turning of the ring 30 will have no influence on the ring 7. At the same time, during manual setting of the diaphragm, a device may be provided for rendering the automatic light-responsive structure inoperative so that the structure will not actuate the ring 7 at this time, since this would be in conflict with the manual setting of the diaphragm, but it is preferred instead to simply arrange the parts so that the projection 39 will be located in the path of movement of the rod 5 only when the diaphragm is set for automatic operation. In the other positions the projection 39 is simply located beyond the path of turning of the rod 5 so that in the event that the light-responsive means is actuated there will be no influence on the diaphragm except when it is set by the operator for automatic operation. Thus, it will be seen from FIG. 1 that when the rings 6 and 7 are turned in a counter clockwise direction, as viewed in FIG. 1, to provide manual operation by cooperation of the index 26 with the scale of aperture sizes, the projection 39 will turn upwardly toward the left beyond the range of movement of the rod 5, so that at this time even if the rod 5 should move downwardly it will have no influence on the diaphragm.

The third possible type of operation which can be provided with the diaphragm arrangement of the invention is operation with flash illumination, and for this purpose the rings 6 and 7 are turned together, simply by manual turning of the ring 6, in a clockwise direction, as viewed in FIG. 1, in order to locate the index 26 in alignment with a selected one of the scale of flash guide members shown at the upper left part of the scale arrangement 27 in FIG. 1. During this rotary movement of the pair of rings 6 and 7 the spring 17 will again maintain the pin 14 in engagement with the end of the slot 12 which is nearest to the pin 16, so that the rings 6 and 7 do not turn with respect to each other while they are being turned to a position which will provide flash operation with a selected flash guide number. During this turning of the rings 6 and 7, the toggle linkage 19, 20 will turn together with the rings and it will be noted that at this time the linkage 19, 20 reaches the lever 34 and has its pin 40 engaged by the camming edge 38 of the lever 34. The portion of the camming edge 38 which will be engaged by the pin 40 which pivotally interconnects the links 19 and 20 will be determined by the guide number selected by the operator. The notches 28 extend upwardly beyond the position shown in FIG. 1 so that the detent means 28, 29 serves to releasably maintain the index 26 and thus the diaphragm ring 6 in an angular position where the index 26 remains in alignment with the selected guide number for flash operation. On the other hand, when the focusing ring 30 is turned at this time the camming edge 32 of the motion transmitting means will turn the lever 34 which will in turn act through its camming edge 38 on the pin 40 for actuating the toggle linkage means 19, 20, and in this way the pin 15 will move along the slot 13 so as to turn the ring 7, and thus the diaphragm will be automatically set on the one hand according to the selected flash guide number, which determines the position of the pin 40 along the cam 38, and on the other hand according to the distance between the subject in the camera, which is determined by the cam 32.

Figure 2:
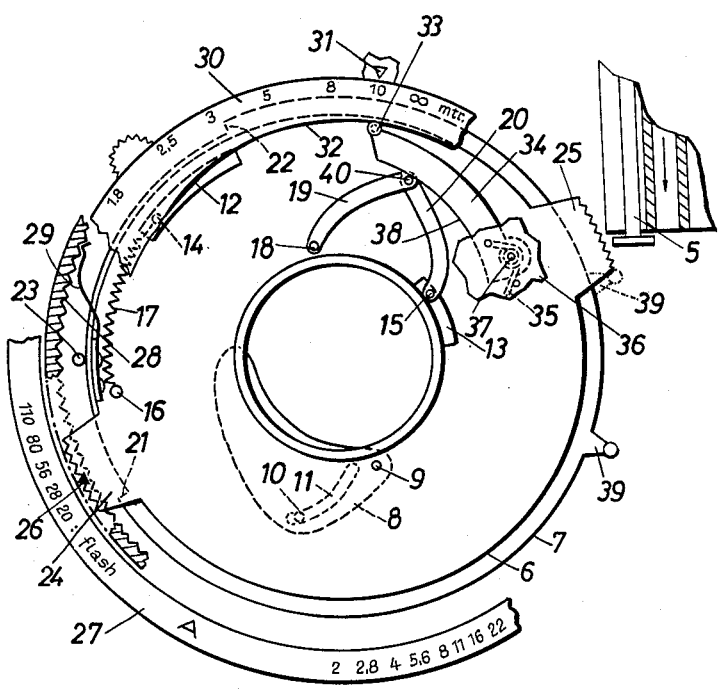
FIG. 2 shows the structure of FIG. 1 in a position different from that of FIG. 1.
Figure 3:
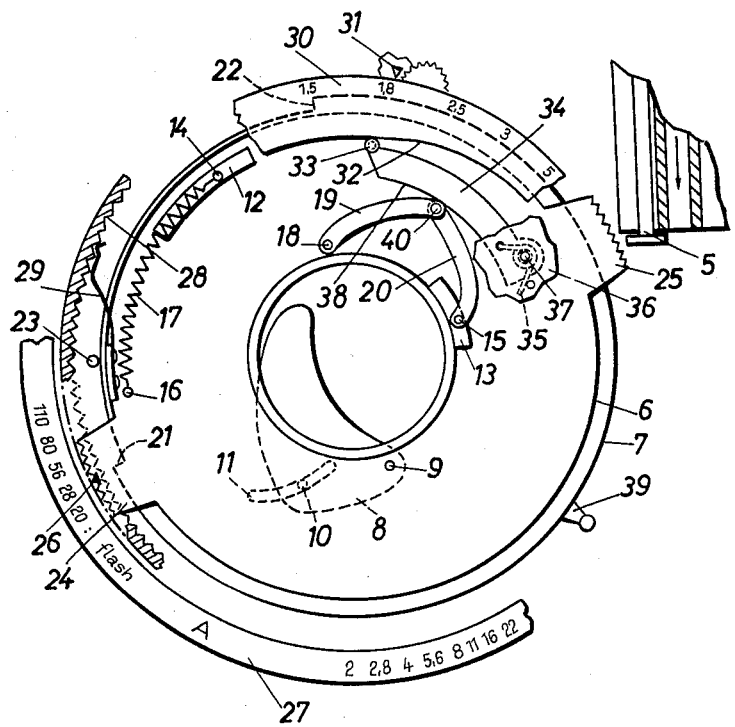
FIG. 3 shows the structure of FIG. 2 in the same position as FIG. 2 but with a different aperture set by the structure.

This operation is shown in FIG. 2, as well as in FIG. 3. In FIG. 2 the parts are shown in the position where the guide number 28 has been selected and where the ring 30 has been set to provide a distance of 10 meters between the subject and the camera. It will be noted that in this position the diaphragm is almost fully open and provides an aperture value of 2.8. However, in the illustration shown in FIG. 3 the flash guide number 28 is still selected but the focusing ring 30 has been turned to provide a distance of 1.8 meters between the subject and the camera, so that the camming portion 32 of the ring 30 has turned the lever 34 and thus the linkage 19, 20 has been actuated to turn the ring 7 and in this way provide a turning of the ring 7 with respect to the ring 6 which is substantially beyond that shown in FIG. 2, so that the aperture is much smaller, as is apparent from the illustrated position of the blade 8. FIGS. 2 and 3 illustrate the row of notches 28 extending beyond the range thereof illustrated fragmentarily in FIG. 1. Thus, while with the position of the parts shown in FIG. 2 an aperture of 2.8 is provided, the simple turning of the focusing ring as illustrated in FIG. 3 has resulted in reducing the aperture to a value of approximately 16. It will be noted that with this construction the scale of distances on the focusing ring may be spread apart to any desired distance since it is only the cam 32 which controls the turning of the lever 34 and thus there is no need to crowd the scale of distances into a small angular portion of the focusing ring 30.

FIG. 2 shows in dot-dash lines the position of the projection 39 of the ring 7 which it takes when the camera is set for automatic operation, and it will be seen that the dot-dash line position of the projection 39 in FIG. 2 is the same as the position thereof shown in FIG. 1. However, when the index 26 is located in alignment with any one of the graduations of the scale of flash guide numbers, the projection 39 will be located in the position shown in FIG. 2 in solid lines or downwardly beyond this position, and in this position it is located beyond the range of movement of the rod 5 so that in this position also it is not possible for the light-responsive means to actuate the ring 7.

The invention of course is not limited to the details described above. Thus, the invention is particularly of advantage when used with a semi-automatic operation of the camera rather than a fully automatic operation thereof, and also the structure of the invention is of great advantage when there is no automatic operation by a light meter at all. Moreover, it is not essential that the spring 17 be connected to the pins 16 and 14. This spring 17 could equally well be connected to the pins 15 and 18. Also, the toggle linkage 19, 20 can be non-symmetrical, if desired. Furthermore, instead of providing a spring wrich urges the pin 33 of the lever 34 against the cam 32 it is possible to provide this cam in the form of a slot, for example, which receives a pin similar to the pin 33, so that it is unnecessary to yieldably urge the lever 34 into engagement with the cam 32. Also, instead of operating the lever 34 directly from the cam 32, although this latter construction is preferred, it is possible to provide a drive intermediate the cam 32 and the lever 34, such as an additional cam drive.

It will be understood that each of the elements described above or two or more together, may also find a useful application in other types of cameras differing from the types described above.

While the invention has been illustrated and described as embodied in cameras having different types of operation, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a camera capable of being operated automatically, with flash illumination, or by hand, in combination, a pair of rotary diaphragm rings for controlling the positions of a plurality of diaphragm blades located between and operatively connected to said rings; and yieldable means connecting said rings to each other for turning movement together, one of said rings being accessible to the operator and being turnable through a given angular range for manual setting of the diaphragm.

2. In a camera capable of being operated automatically, with flash illumination, or by hand, in combination, a pair of rotary diaphragm rings for controlling the positions of a plurality of diaphragm blades located between and operatively connected to said rings; yieldable means connecting said rings to each other for turning movement together, one of said rings being accessible to the operator and being turnable through a given angular range for manual setting of the diaphragm; stop means cooperating with the other of said rings for maintaining the latter stationary when said one ring is manually turned in said range for manually setting the diaphragm, said one ring then turning in opposition to said yieldable means; and releasable detent means releasably holding said one ring in the position in which it is manually turned by the operator for manually setting the diaphragm.

3. In a camera, in combination, a pair of rotary diaphragm rings for controlling diaphragm blades located between and operatively connected to said rings, one of said rings being accessible to the operator for manual setting of the diaphragm; yieldable spring means connected to said rings for yieldably holding them in a predetermined relationship with respect to each other; and a toggle linkage means connected at one end to one of said rings and at its opposite end to the other of said rings, so that said rings are also interconnected by said toggle linkage means.

4. In a camera, in combination, a pair of rotary diaphragm rings for controlling a plurality of diaphragm blades located between and operatively connected to said rings, said rings being turnable together, without relative movement therebetween, to a plurality of positions respectively providing camera operation which is automatic, which is with flash illumination, or which is manual; means cooperating with one of said rings in each of said positions for maintaining said one ring stationary while the other ring turns with respect thereto for controlling the aperture, the ring which is maintained stationary in one of said positions being different from the ring which is maintained stationary in another of said positions; and yieldable resilient means cooperating with said rings for holding them in a predetermined angular relationship with respect to each other during turning of said rings together to or from any of said positions.

5. In a camera capable of being operated with flash illumination, automatically, or manually, in combination, a pair of rotary diaphragm rings for controlling a plurality of diaphragm blades located between and operatively connected to said rings, one of said rings being accessible to the operator for manual setting of the diaphragm and said rings being turnable together to an automatic position to provide automatic operation of the camera; means yieldably holding said one ring stationary when said rings are in said automatic position; and light-responsive means cooperating with the other of said rings for turning the latter to set the diaphragm automatically when said rings are in said automatic position thereof.

6. In a camera, in combination, a pair of rotary diaphragm rings for controlling a plurality of diaphragm blades located between and operatively connected to said rings, said rings being turnable together to one of a plurality of predetermined angular positions providing flash operation of the camera; a scale of flash guide numbers cooperating with one of said rings for determining that one of said plurality of angular positions thereof which will provide flash operation according to a selected guide number; releasable holding means releasably holding said one ring in a selected one of said positions; a focusing ring turnable by the operator for determining the distance between the camera and the subject which is to be photographed with flash illumination; and motion transmitting means cooperating with said focusing ring and with the other of said diaphragm rings for turning the latter ring upon turning of said focusing ring, while said one ring remains stationary, to automatically set the aperture in accordance with the distance between the subject and the camera set with said focusing ring.

7. In a camera, in combination, a pair of rotary diaphragm rings for controlling a plurality of diaphragm blades located between and operatively connected to said rings, said rings being turnable together to one of a plurality of predetermined angular positions providing flash operation of the camera; a scale of flash guide numbers cooperating with one of said rings for determining that one of said plurality of angular positions thereof which will provide flash operation according to a selected guide number; releasable holding means releasably holding said one ring in a selected one of said positions; a focusing ring turnable by the operator for determining the distance between the camera and the subject which is to be photographed with flash illumination; and motion transmitting means cooperating with said focusing ring and with the other of said diaphragm rings for turning the latter ring upon turning of said focusing ring, while said one ring remains stationary, to automatically set the aperture in accordance with the distance between the subject and the camera set with said focusing ring, said motion transmitting means including a turnable lever and a cam connected to said focusing ring for turning movement therewith and cooperating with said lever for changing the angular position thereof in accordance with the angular position of said focusing ring.

8. In a camera, in combination, a pair of rotary diaphragm rings for controlling a plurality of diaphragm blades located between and operatively connected to said rings, said rings being turnable together to one of a plurality of predetermined angular positions providing flash operation of the camera; a scale of flash guide numbers cooperating with one of said rings for determining that one of said plurality of angular positions thereof which will provide flash operation according to a selected guide number; releasable holding means releasably holding said one ring in a selected one of said positions; a focusing ring turnable by the operator for determining the distance between the camera and the subject which is to be photographed with flash illumination; and motion transmitting means cooperating with said focusing ring and with the other of said diaphragm rings for turning the latter ring upon turning of said focusing ring, while said one ring remains stationary, to automatically set the aperture in accordance with the distance between the subject and the camera set with said focusing ring, said motion transmitting means including a turnable lever and a cam connected to said focusing ring for turning movement therewith and cooperating with said lever for changing the angular position thereof in accordance with the angular position of said focusing ring, said lever itself having a camming edge and said motion transmitting means further including a toggle linkage operatively connected with said rings and actuated by said camming edge of said lever for turning said other ring in response to turning of said focusing ring.

9. In a camera, in combination, a pair of rotary diaphragm rings for controlling a plurality of diaphragm blades located between and operatively connected to said rings, said rings being turnable together to one of a plurality of predetermined angular positions providing flash operation of the camera; a scale of flash guide numbers cooperating with one of said rings for determining that one of said plurality of angular positions thereof which will provide flash operation according to a selected guide number; releasable holding means releasably holding said one ring in a selected one of said positions; a focusing ring turnable by the operator for determining the distance between the camera and the subject which is to be photographed with flash illumination; motion transmitting means cooperating with said focusing ring and with the other of said diaphragm rings for turning the latter ring upon turning of said focusing ring, while said one ring remains stationary, to automatically set the aperture in accordance with the distance between the subject and the camera set with said focusing ring, said motion transmitting means including a turnable lever and a cam connected to said focusing ring for turning movement therewith and cooperating with said lever for changing the angular position thereof in accordance with the angular position of said focusing ring, said lever itself having a camming edge and said motion transmitting means further including a toggle linkage operatively connected with said rings and actuated by said camming edge of said lever for turning said other ring in response to turning of said focusing ring; and spring means cooperating with said lever for maintaining the same in engagement with said camming portion of said focusing ring.

10. In a camera adapted to be operated either by flash illumination, automatically, or by hand, in combination, a pair of rotary diaphragm rings for controlling a plurality of diaphragm blades located between and operatively connected to said rings; means holding said rings yieldably together in a predetermined angular position relative to each other during turning of said rings to a plurality of positions respectively providing manual, automatic, or flash operation; means yieldably holding one of said rings stationary when said rings have been turned to a position providing automatic operation; light-responsive means for automatically turning the other of said rings during automatic operation, said light-responsive means having a member which moves along a predetermined path through a given distance according to the lighting conditions; and a projection connected to said upper ring and located in said path of movement of said member of said light-responsive means to be actuated thereby when said rings are in their automatic position.

11. In a camera adapted to be operated either by flash illumination, automatically, or by hand, in combination, a pair of rotary diaphragm rings for controlling a plurality of diaphragm blades located between and operatively connected to said rings; means holding said rings yieldably together in a predetermined angular position relative to each other during turning of said rings to a plurality of positions respectively providing manual, automatic, or flash operation; means yieldably holding one of said rings stationary when said rings have been turned to a position providing automatic operation; light-responsive means for automatically turning the other of said rings during automatic operation, said light-responsive means having a member which moves along a predetermined path through a given distance according to the lighting conditions; and a projection connected to said upper ring and located in said path of movement of said member of said light-responsive means to be actuated thereby when said rings are in their automatic position, said projection being located out of the path of movement of said member when said rings are in said manual or flash operating position.

References Cited in the file of this patent
UNITED STATES PATENTS

| | | |
|---|---|---|
| 2,911,897 | Fahl | Nov. 10, 1959 |
| 2,935,922 | Rentschler | May 10, 1960 |
| 2,989,908 | Bolsey | June 27, 1961 |